T. S. FERGUSON.

EGG CARRIER.

No. 11,640. Reissued Dec. 7, 1897.

Witnesses
Martin A. Olsen.
Leonora Wiseman.

Inventor
Thomas Schooley Ferguson
by Edward Rector
his atty.

UNITED STATES PATENT OFFICE.

THOMAS SCHOALES FERGUSON, OF OMAHA, NEBRASKA, ASSIGNOR, BY DIRECT AND MESNE ASSIGNMENTS, TO THE FERGUSON COMPANY, LIMITED, OF SAME PLACE.

EGG-CARRIER.

SPECIFICATION forming part of Reissued Letters Patent No. 11,640, dated December 7, 1897.

Original No. 550,494, dated November 26, 1895. Application for reissue filed July 27, 1896. Serial No. 600,730.

*To all whom it may concern:*

Be it known that I, THOMAS SCHOALES FERGUSON, a citizen of the United States, residing at Omaha, in the county of Douglas and State of Nebraska, have invented a certain new and useful Improvement in Egg-Carriers, of which the following is a description, reference being had to the accompanying drawings, forming part of this specification.

My invention has for its object the provision of improved means for the shipping, handling, and storage of eggs which shall facilitate such work and lessen the liability of breakage.

To this end it consists in an improved carrier for the eggs, composed of a suitable case and a series of removable egg-supporting trays of novel construction fitting therein and adapted to receive and support the eggs, all as will be hereinafter more fully described, and particularly pointed out in the claims.

Figure 1:
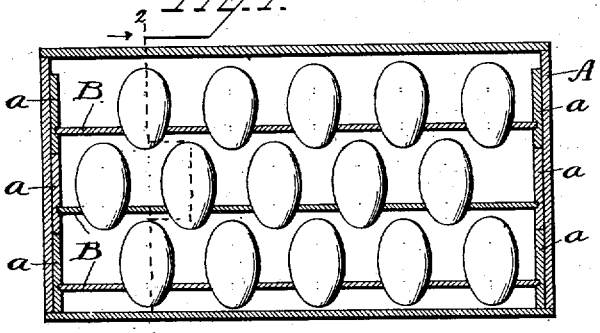
Figure 2:
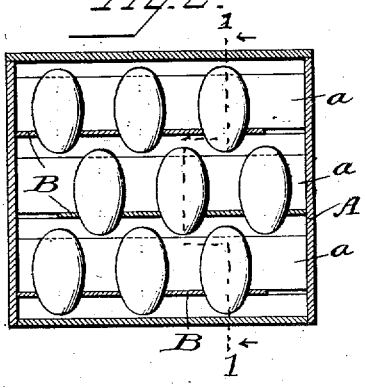
Figure 3:
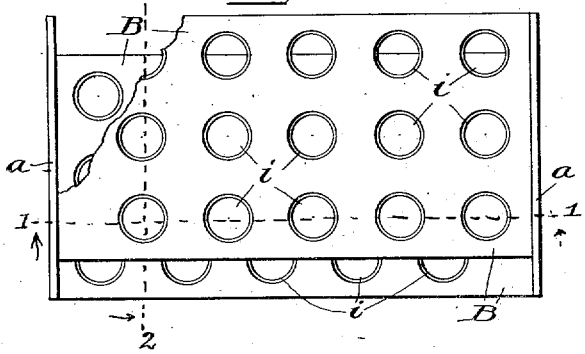

In the accompanying drawings, Figure 1 is a longitudinal vertical section through an egg-carrier embodying my invention, approximately on the line 1 1 of Figs. 2 and 3; Fig. 2, a vertical cross-section of the same, approximately on the line 2 2 of Figs. 1 and 3; Fig. 3, a top plan view of two of the egg-supporting trays placed in reversed position one upon the other, part of the upper tray being broken away to expose the tray beneath; and Fig. 4, a perspective view of a single tray of greater capacity than those illustrated in the preceding figures.

Figure 4:
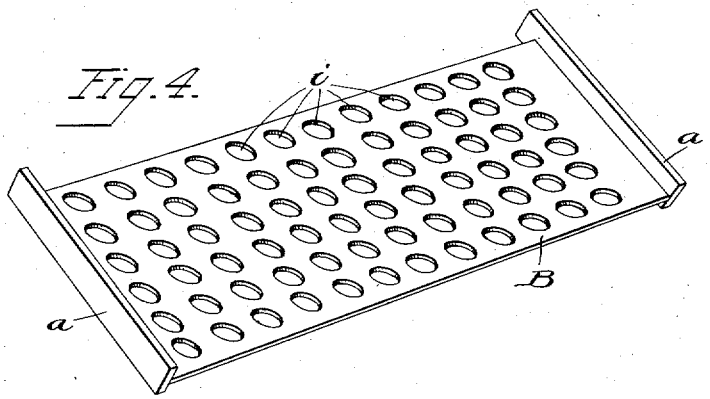

The case may be of suitable size and shape to receive any desired number of trays, and each tray may be arranged to receive and support any desired number of eggs. In the first three figures of the drawings the case is shown as containing three trays and each tray as containing fifteen eggs; but in the commercial handling of eggs the carriers now in general use (not of my invention) are usually arranged to receive five tiers or layers of eggs, each containing seventy-two eggs, so that the capacity of the ordinary carrier is thirty dozens of eggs. In Fig. 4 of the drawings I have therefore shown one of my novel trays of a capacity adapted to this commercial usage, it being provided with seats to receive seventy-two eggs, this tray corresponding, excepting in size, to those shown in the first three figures of the drawings. In commercial use five trays such as that shown in Fig. 4 would be employed in each carrier.

In the drawings, A represents the usual or any suitable rectangular box or case adapted to receive the trays, which are inserted from the top. The trays are all alike, and each is composed of a body portion B and two cross-pieces *a a*, secured to the ends thereof. The portion B consists of a board of suitable thickness and of approximately the same length as the interior of the case which is to receive the trays and of a width somewhat less than the interior of the case for a purpose hereinafter explained. The end pieces *a a* are of substantially the full width of the interior of the case, so as to snugly fit therein and prevent lateral movement of the tray. One end of each piece *a* is approximately flush with the adjacent edge of the body B of the tray, while its opposite end projects beyond the opposite edge of the body B, so that when the tray is placed within the case an open space will be left along one edge of the tray between the latter and the wall of the casing. The body B of each tray is provided with the series of egg-seatings *i*, shaped to receive and fit and support the eggs, the latter being placed in the seats with their smaller ends downward, in which position they are least likely to become displaced from their seats in the tray during the handling of the latter and which position is also best for their preservation. The series of egg-seatings *i* in each tray extends nearer one end of the tray than the other, so that the row of eggs across one end of the tray will be nearer the adjacent end of the tray than is the row of eggs across the opposite end of the tray in respect to its end of the tray. Owing to the fact that the tray is of less width than the interior of the case, as before explained, the two rows of eggs along the opposite edges of the tray will likewise be unequally distant from their respective sides of the case. It follows from this arrangement that when two trays are placed one above the other in reverse position, as in Fig. 3, the eggs in the two trays will stand out of vertical line with each other, so that the lower ends of the eggs in the upper tray may occupy the spaces between the upper ends of the eggs in the lower tray and the trays be compactly arranged within the case without any danger of contact between the eggs in the adjacent trays. The trays are placed in the case in this alternate order and supported one upon the other by their end pieces *a a*.

The construction of the trays with their body portions B of less width than the interior of the casing and with their end pieces *a a* projecting beyond the edges of the trays at one side leaves open spaces at the opposite edges of the adjacent trays when placed in the case, so that there may be free circulation of air back and forth between the trays from the top to the bottom of the series and perfect ventilation be thus obtained.

The eggs may be placed in the case a trayful at a time and be removed therefrom a trayful at a time and be handled for any desired purpose by the trayful, and the necessity for a separate and individual handling of the eggs be to a large extent avoided and the handling of large quantities of eggs be thus greatly facilitated and the liability of breakage reduced to the minimum.

Having thus fully described my invention, I claim—

1. In an egg-carrier, the combination, with a case A, of the series of egg holding and supporting trays, each consisting of the horizontal body portion B provided with the egg-seatings *i* shaped to receive, fit, and support the eggs and arranged in the manner specified, and the transverse end pieces *a a* secured to the opposite ends of the body B, the series of such trays being arranged in the case A one above the other in the reverse order described and supported one upon another by means of their end pieces *a a*, whereby the trays are separated a suitable distance from each other and whereby the egg-seatings of the adjacent trays are caused to stand out of vertical line with each other so that the eggs supported in the seatings in one tray may not contact with the eggs in the seatings of the trays above and below it, as set forth.

2. In an egg-carrier, the combination, with a case A, of the series of egg holding and supporting trays, each tray consisting of the horizontal body portion B, of less width than the case and provided with the egg-seatings *i* shaped to receive, fit and support the eggs and arranged in the manner specified, and the transverse end pieces *a a* secured to the opposite ends of the body B and projecting laterally beyond it at one edge, the series of such trays being arranged in the case A one upon another in the reverse order described and supported one upon another by their end pieces *a a*, whereby the trays are separated a suitable distance from each other and the egg-seatings of the adjacent trays are caused to stand out of vertical line with each other so that the eggs therein may not contact, and whereby a free passage is provided for the circulation of air back and forth between the trays from the top to the bottom of the series, substantially as and for the purpose set forth.

THOMAS SCHOALES FERGUSON.

Witnesses:
F. K. DARLING,
L. W. BUELL.